(12) United States Patent
Muthusamy et al.

(10) Patent No.: US 12,423,631 B1
(45) Date of Patent: Sep. 23, 2025

(54) AUTONOMOUS MULTI-DIMENSION SEGMENTATION USER INTERFACE WORKFLOW

(71) Applicant: Blue Yonder Group, Inc., Scottsdale, AZ (US)

(72) Inventors: Ganesh Muthusamy, Hyderabad (IN); Abhishek Singh, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 124 days.

(21) Appl. No.: 17/582,350

(22) Filed: Jan. 24, 2022

Related U.S. Application Data

(60) Provisional application No. 63/146,086, filed on Feb. 5, 2021, provisional application No. 63/140,337, filed on Jan. 22, 2021.

(51) Int. Cl.
*G06Q 10/0631* (2023.01)

(52) U.S. Cl.
CPC .............................. *G06Q 10/06315* (2013.01)

(58) Field of Classification Search
CPC ................................................ G06Q 10/06315
USPC ........................................................ 705/7.25
See application file for complete search history.

(56) References Cited

U.S. PATENT DOCUMENTS

| | | | |
|---|---|---|---|
| 7,523,483 B2 * | 4/2009 | Dogan | G06Q 10/087 726/1 |
| 10,366,362 B1 * | 7/2019 | Reddy | G06Q 10/067 |
| 11,397,957 B1 * | 7/2022 | Najmi | G06Q 10/06393 |
| 2021/0158259 A1 * | 5/2021 | Evans | G06Q 10/04 |
| 2023/0153753 A1 * | 5/2023 | Rochon | G06Q 10/087 705/28 |

OTHER PUBLICATIONS

Fichtinger et al., "A joint network design and multi-echelon inventory optimisation approach for supply chain segmentation," International Journal of Production Economics, vol. 209, pp. 103-111, 2017.
Godsell et al., "Enabling supply chain segmentation through demand profiling," International Journal of Physical Distribution & Logistics Management, vol. 41, Issue 3, pp. 296-314, 2011.

* cited by examiner

*Primary Examiner* — Abdallah A El-Hage Hassan
(74) *Attorney, Agent, or Firm* — Spencer Fane LLP; Steven J. Laureanti

(57) ABSTRACT

A system and method of autonomous multi-dimensional segmentation for a supply chain network. Embodiments include a supply chain network of one or more supply chain entities, a segmentation planner having a computer and memory, the segmentation planner configured to access input data relating to one or more supply chain entities, discover one or more features related to the input data, pre-process the input data and features, perform multi-dimension segmentation on the input data, generate one or more segment output visualizations, assign policy parameters to the multi-dimension segmentation performed on the input data.

18 Claims, 14 Drawing Sheets

FIG. 7

*(Figure 7 shows a user interface screenshot labeled 700, with regions labeled 702, 704, 706, and 708.)*

My App > Luminate Segmentation > New Strategy | Strategy ▼

New Strategy

Increase Service Level
Department: Automotive | Customer: All | Region: All | Dimensions: (Average Demand Interval ×) (Demand COV ×) (Forecast ×) (Unit Price ×) (Forecast Revenue ×) +3 More

AUTO SEGMENTATION | ANALYTICS | POLICY

Policy Parameters *(Drag and Drop to left panel)*

- ❖ Efficient >
  - Customer Service Level 88%
  - Inventory Strategy: Medium TSL at CDC
  - Replenishment Strategy: Coverage based DRP Rule
  - Inventory Allocation Strategy: FCFS Policy
  - Transportation Model Strategy: FTL, No Expedite
- ❖ Balanced ∨
- ❖ Responsive ∨
- ❖ Agile ∨
- ❖ Very Responsive ∨

706

Assign Policy Parameter *(Drag Policy Parameter on Segment to assign)*

| ☐ Segment 1 | Assigned Policy Efficient (CSL 88%) ▶ > |
| ☐ Segment 2 | Assigned Policy Agile (CSL 86%) ▶ > |
| ☐ Segment 3 | Assigned Policy Efficient (CSL 88%) ▶ > |
| ☐ Segment 4 | Assigned Policy Balanced (CSL 90%) ▶ > |
| ☐ Segment 5 | Assigned Policy Responsive (CSL 92%) ▶ > |
| ☐ Segment 6 | Assigned Policy Very Responsive (CSL 94%) ▶ > |
| ☐ Segment 7 | Assigned Policy Balanced (CSL 90%) ▶ > |
| ☐ Segment 8 | Assigned Policy Agile (CSL 86%) ▶ > |
| ☐ Segment 9 | Assigned Policy Responsive (CSL 92%) ▶ > |
| ☐ Segment 10 | Assigned Policy Agile (CSL 86%) ▶ > |

702

704

Collaboration  +

Hey Sam, check these fresh segmentation, would help us to align with our Goal. What's your take on Parameter policy.
Today 9:00am Looks great, we can continue with these parameters
Today 10:30am Yeah, all looks good. We can go with it.
Today 10:36am Ok, I am drafting it.
Now Type New Message Here

708

AUTONOMOUS MULTI-DIMENSION SEGMENTATION USER INTERFACE WORKFLOW

CROSS-REFERENCE TO RELATED APPLICATIONS

The present disclosure is related to that disclosed in the U.S. Provisional Application No. 63/140,337 filed Jan. 22, 2021, entitled "Autonomous Multi-Dimension Segmentation Workflow", and related to that disclosed in the U.S. Provisional Application No. 63/146,086 filed Feb. 5, 2021, entitled "Autonomous Multi-Dimension Segmentation User Interface Workflow". U.S. Provisional Application No. 63/140,337 and U.S. Provisional Application No. 63/146, 086 are assigned to the assignee of the present application. The present invention hereby claims priority under 35 U.S.C. § 119 (e) to U.S. Provisional Application No. 63/140, 337 and U.S. Provisional Application No. 63/146,086.

TECHNICAL FIELD

The present disclosure relates generally to segmentation planning and specifically to generating and updating segments autonomously and to providing user interface analytics and parameter assignment options.

BACKGROUND

Segmentation refers to the process of dividing one or more target markets into sub-sections, or segments, that can be targeted with specific products, communications and communication channels, supply chain logistical procedures, and/or other business processes. A business entity may segment a market based on one or more of many possible segmentation features, including but not limited to geographic features (such as customer location, state, rural-urban, etc.), demographic features (such as customer gender, age, or job), behavioral features (such as products tailored towards impulse purchases), and psychological features (such as products designed to appeal to "green" consumers by reducing environmental impact on the planet). A segmentation planner's choice of segments, and the features used to define or select each segment, may also be based on one or more features or attributes of one or more products to be sold to different segments of the market. By way of example and not by way of limitation, attributes or features may include, for one or more products, unit cost, location type, item forecast volume, item historical quantity, coefficient of variability, cumulative demand, and/or any other features. However, over-segmenting a market based on too many features or attributes may over-complicate supply chain models and plans intended to service the over-segmented market, and under-segmenting a market may improperly mix customers, retailers, suppliers, and manufacturers together into broad segments that fail to account for unique market contours of the customers and business entities. Even initially-correct market segmentation decisions may become out of date quickly as new customers and businesses enter and exit the market faster than the segmentation decisions can be updated and user interfaces and analytics can communicate these changes to decision makers. These outcomes lead to inefficient allocation of supply chain inventory and sub-optimal service levels, and are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates an exemplary policy parameter assignment visualization, according to an embodiment;

DETAILED DESCRIPTION

Figure 1:
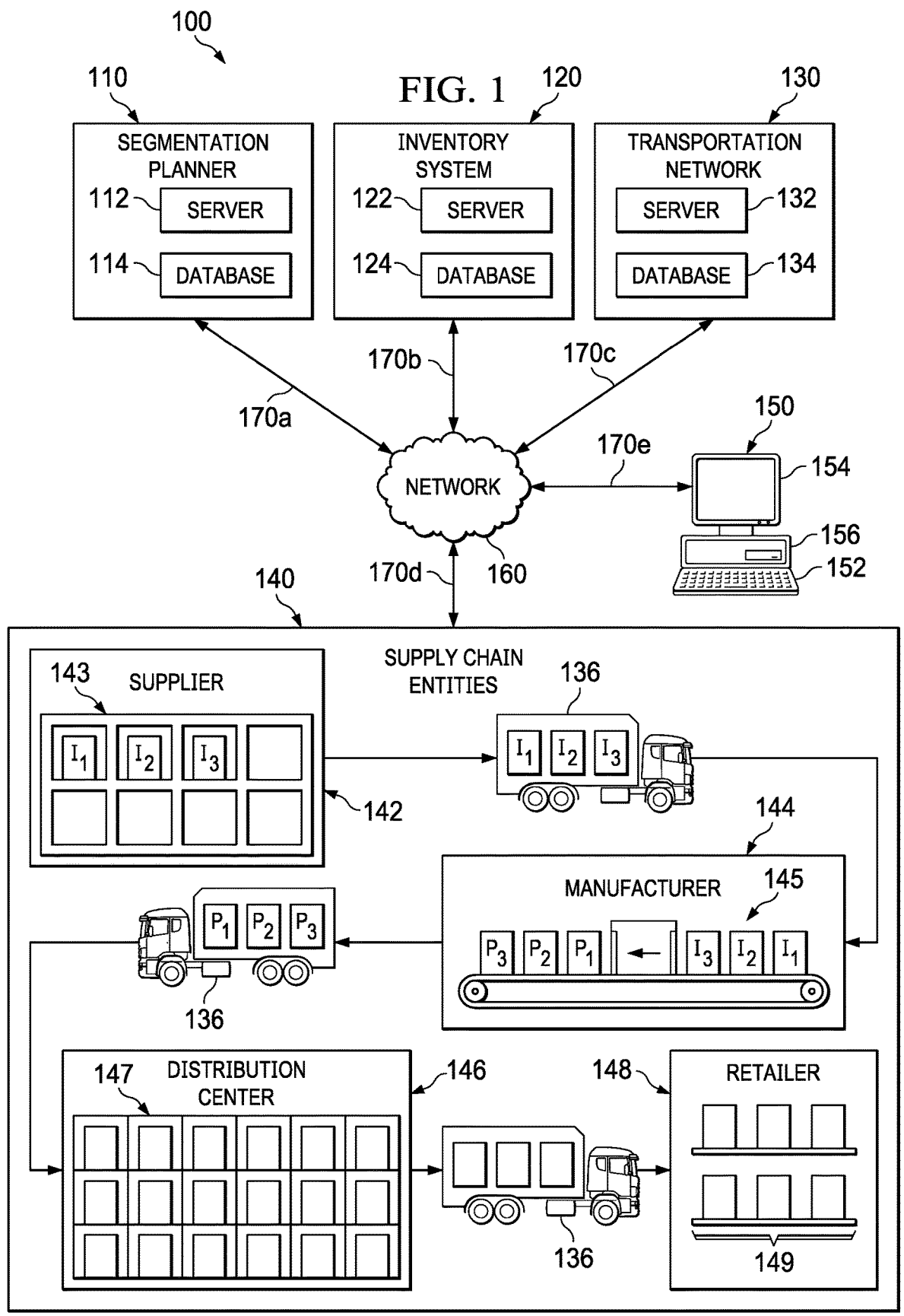
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide an autonomous multi-dimension segmentation workflow system and method to provide dynamic, adaptable market segmentation decisions for supply chain networks and business environments. Embodiments utilize a segmentation planner to manage input data, discover segmentation features relevant to the input data, and pre-process the data before generating segments. Embodiments of the segmentation planner analyze the generated segments for one or more unimportant or no-longer-relevant features and, if one or more unimportant or no-longer-relevant features are detected, the segmentation planner removes the unimportant or no-longer-relevant features from the list of segments. Embodiments of the segmentation planner generate one or more graphical user interface (GUI) displays visualizing the segments and a plurality of user interface analytical displays related to the segments, and assign policy parameters to the segments.

Embodiments generate a plurality of segmentation analytics user interfaces that enable segmentation planners to segment markets efficiently and automatically, selecting a sufficient quantity of segmentation features to adequately segment a market without over-granulizing the market with unnecessary segmentation features. Embodiments autonomously update segmentation analytics and user interface displays as new data become available, circumstances change, and as customers and other businesses enter and exit the market over time. Embodiments automatically detect the presence of non-critical features and segments, and remove non-critical features and segments from segmentation planning to reduce operating expenses.

FIG. 1 illustrates an exemplary supply chain network 100 according to a first embodiment. Supply chain network 100 comprises segmentation planner 110, inventory system 120, transportation network 130, one or more supply chain entities 140, computer 150, network 160, and communication links 170. Although a single segmentation planner 110, inventory system 120, transportation network 130, one or more supply chain entities 140, a single computer 150, and a single network 160 are shown and described, embodiments contemplate any quantity of segmentation planners 110, inventory systems 120, transportation systems, supply chain entities 140, computers 150, or networks 160, according to particular needs.

In one embodiment, segmentation planner 110 comprises server 112 and database 114. As described in more detail below, segmentation planner 110 comprises one or more modules to, for example, perform a multi-dimension segmentation to discover segmentation features, generate segments, compute the importance of one or more segmentation features, and to generate user interface analytics displays to visualize the generated segments for decision makers.

Inventory system 120 comprises server 122 and database 124. Server 122 of inventory system 120 is configured to receive and transmit inventory data, including but not limited to item identifiers, pricing data, attribute data, inventory levels, and other like data about one or more items or products at one or more locations in supply chain network 100. Server 122 stores and retrieves inventory data from database 124 or from one or more locations in supply chain network 100.

According to embodiments, inventory database 124 includes current or projected inventory quantities or states, order rules, or explanatory variables. For example, inventory database 124 may comprise the current level of inventory for each item at one or more stocking points across supply chain network 100. In addition, inventory database 124 may comprise order rules that describe one or more rules or limits on setting an inventory policy, including, but not limited to, a minimum order quantity, a maximum order quantity, a discount, and a step-size order quantity, and batch quantity rules. According to some embodiments, inventory database 124 may comprise explanatory variables that describe the data relating to specific past, current, or future indicators and the data of promotions, seasonality, special events (such as sporting events), weather, and the like. According to some embodiments, segmentation planner 110 accesses and stores inventory data in inventory database 124, which may be used by segmentation planner 110 to generate one or more segments according to the methods described herein. In addition, or as an alternative, the inventory data of inventory database 124 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles 136 to ship one or more items between one or more supply chain entities 140, based, at least in part, on segments and/or instruction sets generated by segmentation planner 110. Transportation vehicles 136 comprise, for example, any quantity of trucks, cars, vans, boats, airplanes, unmanned aerial vehicles (UAVs), cranes, robotic machinery, or the like. Transportation vehicles 136 may comprise radio, satellite, or other communication systems that communicate location information (such as, for example, geographic coordinates, distance from a location, global positioning satellite (GPS) information, or the like) with segmentation planner 110, inventory system 120, transportation network 130, and/or one or more supply chain entities 140 to identify the location of transportation vehicle 136 and the location of any inventory or shipment located on transportation vehicle 136. The quantity of items shipped by transportation vehicles 136 in transportation network 130 may also be based, at least in part, on the quantity of items currently in stock at one or more supply chain entities 140, the quantity of items currently in transit in transportation network 130, a forecasted demand, a supply chain disruption, and the like.

As shown in FIG. 1, supply chain network 100 operates on one or more computers 150 that are integral to or separate from the hardware and/or software that support segmentation planner 110, inventory system 120, transportation network 130, and one or more supply chain entities 140. Supply chain network 100 comprising segmentation planner 110, inventory system 120, transportation network 130, and one or more supply chain entities 140 may operate on one or more computers 150 that are integral to or separate from the hardware and/or software that support segmentation planner 110, inventory system 120, transportation network 130, and one or more supply chain entities 140. One or more computers 150 may include any suitable input device 152, such as a keypad, mouse, touch screen, microphone, or other device to input information. One or more computers 150 may also include any suitable output device 154, such as, for example, a computer monitor, that may convey information associated with the operation of supply chain network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to supply chain network 100.

Computer 150 may include one or more processors 156 and associated memory to execute instructions and manipulate information according to the operation of supply chain network 100 and any of the methods described herein. One or more processors 156 may execute an operating system program stored in memory to control the overall operation of computer 150. For example, one or more processors 156 control the reception and transmission of signals within the system. One or more processors 156 execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, supply chain network 100 may comprise a cloud-based computing system having processing and storage devices at one or more locations, local to, or remote from segmentation planner 110, inventory system 120, transportation network 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with segmentation planner 110, inventory system 120, transportation network 130, and one or more supply chain entities 140.

These one or more users may include, for example, a "manager" or a "planner" handling generation of segments, supply chain plans and instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, shelving resets, task management, communication and assignment of instructions, issue identification and resolution, controlling manufacturing equipment, and adjusting various levels of manufacturing and inventory levels at various stocking points and distribution centers 146, and/or one or more related tasks within supply chain network 100.

One or more supply chain entities 140 represent one or more supply chain networks 100, including one or more enterprises, such as, for example networks 160 of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers 144 based, at least in part, on supply chain plans and/or instruction sets determined by segmentation planner 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on supply chain plans and/or instruction sets determined by segmentation planner 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on one or more supply chain plans generated by segmentation planner 110.

Retailers 148 may be any suitable entity that obtains one or more products to sell to one or more customers. Retailers 148 may (like the other one or more supply chain entities 140) comprise a corporate structure having a retail headquarters and one or more retail stores. Retail headquarters comprises a central planning office with oversight of one or more retail stores. Retailer 148 stores may comprise any online or brick-and-mortar store, including stores with shelving systems 149. One or more retail stores may sell products according to rules, strategies, orders, and/or guidelines developed by one or more retail headquarters. For example, retail headquarters may create supply chain plans that determine how the store will shelve or display one or more products. Although supply chain plan execution may be performed in part by one or more retail employees, embodiments contemplate automated configuration of shelving and retail displays. This may include, for example, automated robotic shelving machinery that places products on shelves or automated shelving that automatically adjusts based, at least in part, on the supply chain plans. Shelving systems 149 may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are shown and described as separate and distinct entities, the same entity may simultaneously act as any one of one or more supply chain entities 140. For example, one or more supply chain entities 140 acting as manufacturer 144 can produce a product, and the same one or more supply chain entities 140 can act as supplier 142 to supply an item to itself or another one or more supply chain entities 140. Although one example of supply chain network 100 is shown and described in FIG. 1, embodiments contemplate any configuration of supply chain network 100, without departing from the scope described herein.

In one embodiment, each of segmentation planner 110, inventory system 120, transportation network 130, computer 150, and supply chain entities 140 may be coupled with network 160 using communication links 170, which may be any wireline, wireless, or other link suitable to support data communications between segmentation planner 110 and network 160 during operation of supply chain network 100. Although communication links 170 are shown as generally coupling segmentation planner 110, inventory system 120, transportation network 130, one or more supply chain entities 140, and computer 150 to network 160, any of segmentation planner 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling segmentation planner 110, inventory system 120, transportation network 130, one or more supply chain entities 140, and computer 150. For example, data may be maintained locally to, or externally of segmentation planner 110, inventory system 120, transportation network 130, one or more supply chain entities 140, and computer 150 and made available to one or more associated users of segmentation planner 110, inventory system 120, transportation network 130, one or more supply chain entities 140, and computer 150 using network 160 or in any other appropriate manner. For example, data may be maintained in a cloud database at one or more locations external to segmentation planner 110, inventory system 120, transportation network 130, one or more supply chain entities 140, and computer 150 and made available to one or more associated users of the segmentation planner 110, inventory system 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with principles of embodiments described herein, segmentation planner 110 may generate segments, supply chain plans, user interfaces, and/or instruction sets for the inventory of one or more supply chain entities 140 in supply chain network 100. Furthermore, segmentation planner 110, inventory system 120, and/or transportation network 130 may instruct automated machinery (i.e., robotic warehouse systems, robotic inventory systems, automated guided vehicles, mobile racking units, automated robotic production machinery 145, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more supply chain plans and instruction sets, generated plans and policies and/or current inventory or production levels. When the inventory of an item falls to a reorder point, segmentation planner 110 may then automatically adjust product mix ratios, inventory levels, production of products of manufacturing equipment, and proportional or alternative sourcing of one or more supply chain entities 140 until the inventory is resupplied to a target quantity.

For example, the methods described herein may include computers 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 150 looking up the received product data in a database system associated with segmentation planner 110, inventory system 120, and/or transportation network 130 to identify the item corresponding to the product data received from the automated machinery.

Computers 150 may also receive, from the automated machinery, a current location of the identified item. Based on the identification of the item, computers 150 may also identify (or alternatively generate) a first mapping in the database system, where the first mapping is associated with the current location of the item. Computers 150 may also identify a second mapping in the database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, at least in part, on one or more differences between the first mapping and the second mapping such as, for example, to locate an item to add to or remove from a shelf or an inventory of or shipment for one or more supply chain entities 140. In addition, or as an alternative, segmentation planner 110 may monitor the supply chain constraints of one or more items at one or more supply chain entities 140 and adjusts the orders and/or inventory of the one or more supply chain entities 140 based on the supply chain constraints.

Although the systems and methods are described below primarily in connection with supply chain network 100 solely for the sake of clarity, embodiments contemplate the systems and methods described herein generating segments in any business environment and with any quantity of participating customers, demographics, and/or other business entities, and in response to any quantity of features, attributes, intersections, products, and/or items.

Figure 2:
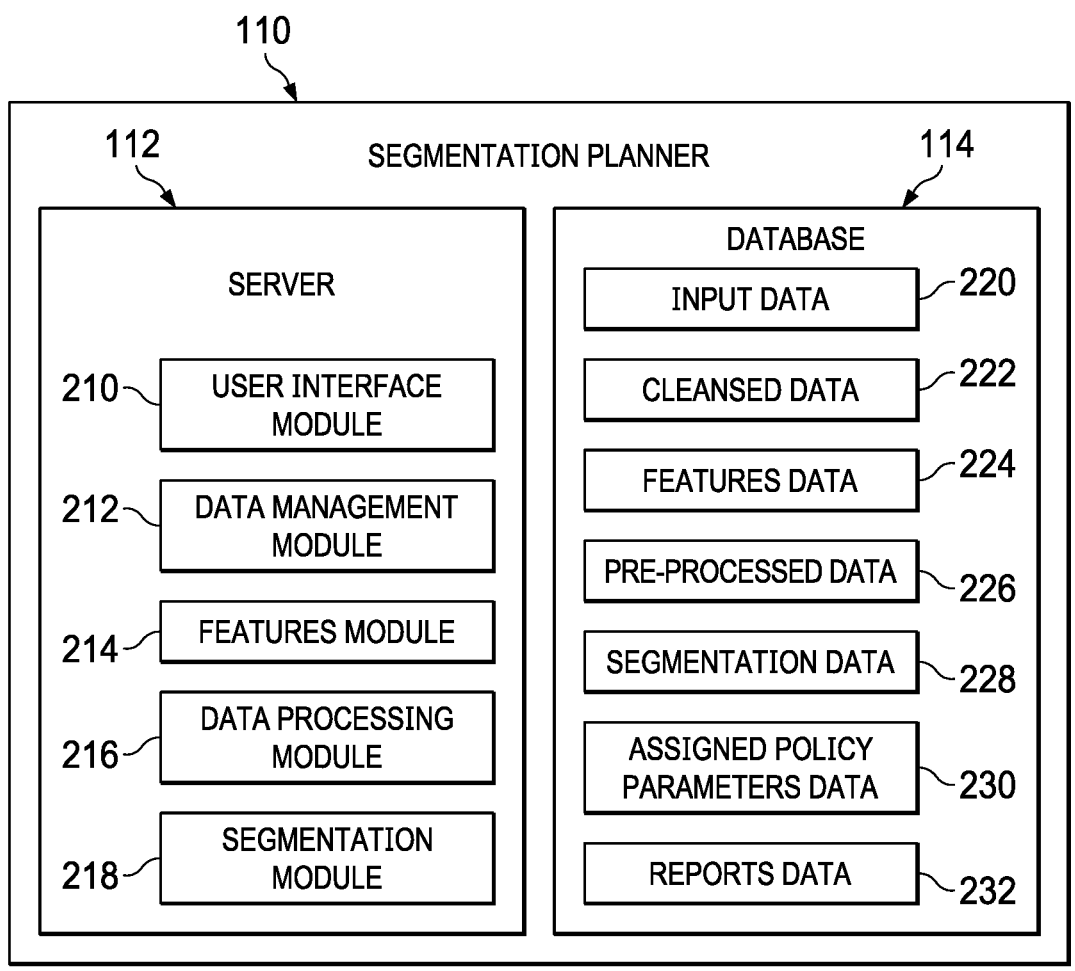
FIG. 2 illustrates the segmentation planner of FIG. 1 in greater detail in accordance with an embodiment.

FIG. 2 illustrates segmentation planner 110 of FIG. 1 in greater detail in accordance with an embodiment. As described above, segmentation planner 110 may comprise one or more computers 150 at one or more locations including associated input devices 152, output devices 154, non-transitory computer-readable storage media, processors 156, memory, or other components for receiving, processing, storing, and communicating information according to the operation of supply chain network 100. Additionally, segmentation planner 110 comprises server 112 and database 114. Although segmentation planner 110 is shown as comprising single server 112 and single database 114, embodiments contemplate any suitable quantity of computers 150, servers 112, or databases 114 internal to or externally coupled with segmentation planner 110. According to some embodiments, segmentation planner 110 may be located internal to one or more retailers 148 of one or more supply chain entities 140. In other embodiments, segmentation planner 110 may be located external to one or more retailers 148 of one or more supply chain entities 140 and may be located in, for example, a corporate retailer of one or more retailers 148, according to particular needs.

Server 112 of segmentation planner 110 may comprise a user interface module 210, data management module 212, features module 214, data processing module 216, and segmentation module 218. Although server 112 is illustrated and described as comprising single user interface module 210, data management module 212, features module 214, data processing module 216, and segmentation module 218, embodiments contemplate any suitable number or combination of these located at one or more locations, local to, or remote from segmentation planner 110, such as on multiple servers 112 or computers 150 at any location in supply chain network 100.

According to embodiments, user interface module 210 receives and processes a user input, such as, for example, input received by input device 152 of one or more computers 150. One or more computers 150 may transmit input to segmentation planner 110 using one or more communication links 170a-170e. User interface module 210 may register the input from one or more computers 150 and transmit the input to data management module 212 and/or features module 214, data processing module 216, and segmentation module 218. In an embodiment, user interface module 210 generates and displays a user interface (UI), such as, for example, a graphical user interface (GUI), that displays one or more interactive visualizations of segmentations, features or attributes, intersections, and/or other data. User interface module 210 may generate one or more GUI displays. The one or more GUI displays may convey information, including supply chain plan data, segmentation data 228, and/or any other type of information about supply chain network 100 and segmentation.

Data management module 212 may access input data 220 stored in segmentation planner database 114, and may transform input data 220 to generate cleansed data 222. Features module 214 may access cleansed data 222 and may analyze cleansed data 222 to locate one or more features. Having located one or more features, features module 214 may store the one or more features in features data 224 of segmentation planner database 114.

Data processing module 216 may access features data 224 and may perform pre-processing actions on the features data 224 to generate pre-processed data 226. Data processing module 216 may store pre-processed data 226 in segmentation planner database 114 pre-processed data 226. Segmentation module 218 may perform multi-dimension segmentation on pre-processed data 226 and may compute feature importance to generate segments, which segmentation module 218 may store in segmentation data 228, as described in greater detail below.

Database 114 of segmentation planner 110 may comprise one or more databases or other data storage arrangements at one or more locations, local to, or remote from, server 112. Database 114 may comprise, for example, input data 220, cleansed data 222, features data 224, pre-processed data 226, segmentation data 228, assigned policy parameters data 230, and reports data 232. Although database 114 is shown and described as comprising input data 220, cleansed data 222, features data 224, pre-processed data 226, segmentation data 228, assigned policy parameters data 230, and reports data 232, embodiments contemplate any suitable number or combination of these, located at one or more locations, local to, or remote from, segmentation planner 110 according to particular needs.

Input data 220 may comprise, for example, any data relating to supply chain system. Input data 220 may comprise data relating to supply chain entities 140, previous supply chain plans, transactions and shipments between supply chain entities 140, or past sales, past demand, purchase data, promotions, events, or the like of one or more products and/or one or more supply chain entities 140. Input data 220 may comprise data regarding one or more features or attributes assigned to one or more products, items, or resources manufactured, transported, or sold throughout supply chain system. Input data 220 may be stored at time intervals such as, for example, by the minute, hour, daily, weekly, monthly, quarterly, yearly, or any suitable time interval, including substantially in real time.

Cleansed data 222 may comprise data in which data management module 212 has determined segment intersections, converted input data 220 from one data storage format into another data storage format, and/or executed any other data modification or cleansing actions. Features data 224 may comprise data in which features module 214 has discovered one or more features, aggregated or dis-aggregated cleansed data 222, and/or executed any other feature discovery actions. Pre-processed data 226 may comprise data that have been pre-processed by data processing module 216 to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224).

Segmentation data 228 may comprise data relating to one or more segments generated by segmentation module 218, as described in greater detail below. Assigned policy parameters data 230 may store one or more policies assigned to one or more segments. Reports data 232 may comprise data relating to one or more reports on one or more segments, features, dimensions, metrics, and/or any other data stored in segmentation planner database 114.

Figure 3:
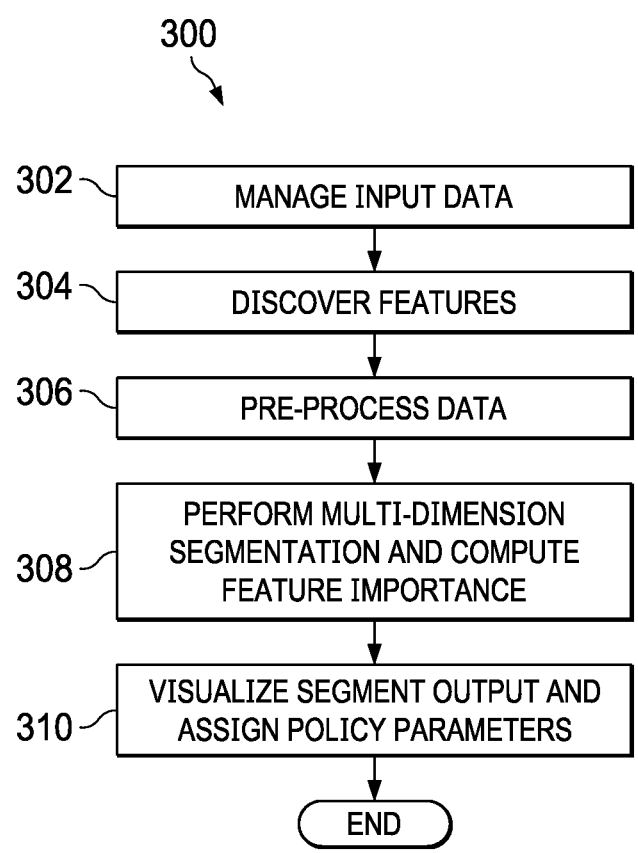
FIG. 3 illustrates an exemplary segment generation method in which the segmentation planner generates and visualizes segments, according to an embodiment.

FIG. 3 illustrates an exemplary segment generation method 300 in which segmentation planner 110 generates and visualizes segments, according to an embodiment. The following segment generation method 300 proceeds by one or more actions, which although described in a particular order may be performed in one or more permutations, combinations, orders, or repetitions, according to particular needs.

At activity 302 of segment generation method 300, data management module 212 manages input data 220 and generates cleansed data 222. Data management module 212 accesses input data 220 stored in segmentation planner database 114. In an embodiment, data management module 212 determines segment intersections based on input data 220. By way of further explanation only and not by way of limitation, an example of input data 220 is given for three items (Item A, Item B and Item C), each of which is stored in various quantities of stock at three locations (Supplier X, Supplier Y, and Supplier Z). Data management module 212 may select granular intersections, in which the exact quantity of each item at each location is imported into cleansed data 222. Continuing with the previous example, data management module 212 may select an exact quantity of each of Item A, Item B and Item C at each of Supplier X, Supplier Y, and Supplier Z to be imported into cleansed data 222. In other embodiments, data management module 212 may select broader, less granular intersections. For the example Item A, Item B, and Item C, data management module 212 may select only the total quantities of Items A, Item B, and Item C across all three Supplier X, Supplier Y, and Supplier Z are imported into cleansed data 222. This example is provided for illustrative purposes only, and embodiments contemplate data management module 212 selecting any form of segment intersections while generating cleansed data 222, using any intersection selection criteria, according to particular needs. In some embodiments, user interface module 210 responds to input to one or more input devices 152, and selects one or more segment intersections directly.

Data management module 212 may transform input data 220 to generate cleansed data 222. Data transformation may comprise converting input data 220 from one data storage format into another data storage format; copying one or more pre-discovered features stored in input data 220 into cleansed data 222; removing one or more pre-discovered features stored in input data 220; and/or any other data modification or cleansing actions. Having generated cleansed data 222, data management module 212 stores cleansed data 222 in segmentation planner database 114.

At activity 304 of segment generation method 300, features module 214 discovers features. Features module 214 accesses cleansed data 222 and discovers features in cleansed data 222 to generate features data 224. In an embodiment, features module 214 accesses cleansed data 222 and aggregates cleansed data 222, dis-aggregates cleansed data 222, or both, based on one or more segment intersections to discover features and generate features data 224. Features module 214 may aggregate and/or dis-aggregate cleansed data 222 based on, for example, a selection of one or more products or resources manufactured, transported, or sold throughout supply chain system; one or more locations or geographic regions throughout supply chain system; or based on any other selection or intersection, according to particular needs. Features module 214 may aggregate and/or dis-aggregate cleansed data 222 using one or more direct input features (such as, for example, price), and/or one or more derived features (such as, for example, coefficient of variability) that features module 214 may compute based on one or more other features stored in cleansed data 222. Having discovered one or more features, features module 214 stores the one or more features in features data 224. In an embodiment, user interface module 210 receives one or more features directly into features data 224 in response to input to one or more input devices 152.

At activity 306 of segment generation method 300, data processing module 216 pre-processes features data 224 to generate pre-processed data 226. According to embodiments, data processing module 216 may access features data 224 and pre-process features data 224 in order to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224). In an embodiment, data processing module 216 reduces the dimensions of one or more features stored in features data 224 to emphasize one or more other features and eliminate redundant features. Data processing module 216 may perform data interpretation on features data 224 to emphasize one or more numerical features, and/or one or more string features, in pre-processed data 226. Having generated pre-processed data 226, data processing module 216 stores pre-processed data 226 in segmentation planner database 114.

At activity 308 of segment generation method 300, segmentation module 218 performs multi-dimension segmentation on pre-processed data 226 and computes feature importance to generate segments. Having generated one or more segments, segmentation module 218 stores the one or more segments in segmentation data 228.

At activity 310 of segment generation method 300, user interface module 210 visualizes segment output and assigns policy parameters to segmentation data 228. User interface module 210 accesses segmentation data 228 and generates one or more GUI displays, suitable for output on one or more output devices 154, to visualize the segment output. In an embodiment, user interface module 210 responds to input to one or more input devices 152, and assigns one or more policy parameters to one or more segments stored in segmentation data 228. By way of example and not by way of limitation, policy parameters may comprise assigning service levels of 90%, 95%, 99%, or any other level to one or more segments. Having assigned one or more policy parameters to one or more segments in segmentation data 228, segmentation planner 110 terminates segment generation method 300.

Figure 4:
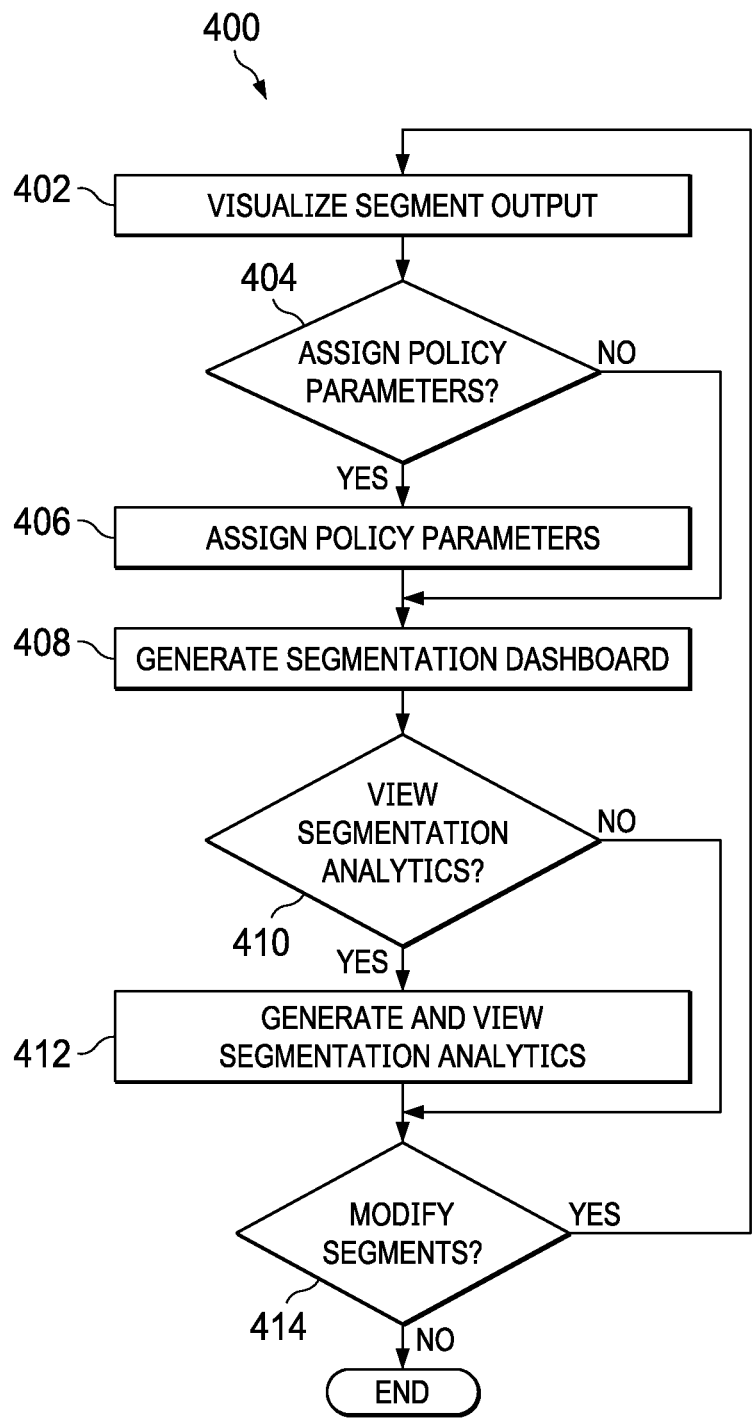
FIG. 4 illustrates an exemplary visualization and policy assignment method, according to an embodiment.

FIG. 4 illustrates an exemplary visualization and policy assignment method 400, according to an embodiment. In an embodiment, segmentation planner 110 may perform one or more actions of visualization and policy assignment method 400 upon reaching activity 310 of segment generation method 300, described above. Visualization and policy assignment method 400 proceeds by one or more actions, which although described in a particular order may be performed in one or more permutations, combinations, orders, or repetitions, according to particular needs.

At activity 402 of visualization and policy assignment method 400, user interface module 210 visualizes segment output. User interface module 210 accesses segmentation data 228 and generates one or more segment visualization displays 500, illustrated by FIG. 5, suitable for output on one or more output devices 154, to visualize the segment output.

At activity 404 of visualization and policy assignment method 400, segmentation module 218 determines whether to assign one or more policy parameters to segmentation data 228. Segmentation module 218 may respond to input from user interface module 210, including but not limited to input to one or more input devices 152 detected by user interface module 210, to determine whether to assign policy parameters to segmentation data 228. If segmentation module 218 receives a command to assign policy parameters as input from user interface module 210, segmentation planner 110 proceeds to activity 406 of visualization and policy assignment method 400 and assigns policy parameters. If segmentation module 218 does not receive a command to assign policy parameters as input from user interface module 210, or if segmentation module 218 does not detect input from user interface module 210, segmentation planner 110 proceeds to activity 408 of visualization and policy assignment method 400 and generates one or more segmentation dashboards.

At activity 406 of visualization and policy assignment method 400, user interface module 210 assigns one or more policy parameters to segmentation data 228. In an embodiment, user interface module 210 accesses segmentation data 228, and generates one or more policy parameter assignment visualizations 700, illustrated by FIG. 7, to display segments and assign policy parameters. In an embodiment, user interface module 210 responds to input to one or more input devices 152, and assigns one or more policy parameters to one or more segments stored in segmentation data 228. User interface module 210 stores the one or more assigned policy parameters in assigned policy parameters data 230.

At activity 408 of visualization and policy assignment method 400, user interface module 210 generates one or more segmentation dashboard visualizations 800. In an embodiment, user interface module 210 accesses segmentation data 228, including one or more segments, and assigned policy parameters data 230, including one or more assigned policy parameters. User interface module 210 generates one or more segmentation dashboard visualizations 800, illustrated by FIG. 8, suitable for output on one or more output devices 154.

At activity 410 of visualization and policy assignment method 400, user interface module 210 determines whether to display one or more segmentation analytics and associated visualizations. User interface module 210 may respond to input to one or more input devices 152 to determine whether to display one or more segmentation analytics and associated visualizations. If user interface module 210 receives a command to display one or more segmentation analytics and associated visualizations as input, segmentation planner 110 proceeds to activity 412 of visualization and policy assignment method 400 and generates and displays segmentation analytics. If user interface module 210 does not receive a command to display one or more segmentation analytics and associated visualizations as input, or if user interface module 210 does not detect input, segmentation planner 110 proceeds to activity 414 of visualization and policy assignment method 400 and determines whether to modify one or more segments.

At activity 412 of visualization and policy assignment method 400, user interface module 210 generates one or more segmentation analytics visualizations 900. In an embodiment, user interface module 210 accesses segmentation data 228, including one or more segments, and assigned policy parameters data 230, including one or more assigned policy parameters. User interface module 210 generates one or more segmentation analytics visualizations 900, illustrated by FIG. 9, suitable for output on one or more output devices 154.

At activity 414 of visualization and policy assignment method 400, segmentation planner 110 determines whether to modify one or more segments. According to embodiments, segmentation planner 110 may add new segments, remove segments, and/or make any other modifications to segments, in response to input to one or more input devices 152. In an embodiment, user interface module 210 may receive a command to modify one or more segments as input. In this embodiment, segmentation planner 110 returns to activity 402 of the visualization and policy assignment method 400, and displays a segment output with a new quantity of segments. In other embodiments in which user interface module 210 does not receive a command to modify one or more segments as input, or if user interface module 210 does not detect input, segmentation planner 110 terminates the actions of visualization and policy assignment method 400.

To illustrate the operation of segmentation planner 110 executing the actions of segment generation method 300 and visualization and policy assignment method 400, the following example is provided. In this example, segmentation planner 110 accesses input data 220 and autonomously generates ten segments for input data 220 that includes four features and attributes (unit price, historical demand volume, life cycle stage, and item category). Although a particular example of segmentation planner 110 generating segments is provided herein, embodiments contemplate segmentation planner 110 implementing the actions of segment generation method 300, and/or visualization and policy assignment method 400, in any order and with respect to any input data 220, features, attributes, intersections, or other circumstances, according to particular needs.

In this example, at activity 302 of segment generation method 300, data management module 212 manages input data 220 and generates cleansed data 222. Data management module 212 accesses input data 220 stored in segmentation planner database 114. In this example, input data 220 comprises, among other data, unit price data, historical demand volume data, life cycle stage data, and item category data for a collection of products sold in and transported throughout supply chain network 100. Data management module 212 generates cleansed data 222 in a single data storage format and stores cleansed data 222 in segmentation planner database 114.

Continuing the example, at activity 304 of segment generation method 300, features module 214 discovers features. Features module 214 accesses cleansed data 222, aggregates or dis-aggregates cleansed data 222 based on segment intersections, discovers any direct input features in cleansed data 222, computes any derived features, and generates features data 224. In this example, features module 214 discovers four derived features: average demand interval, demand COV, forecast, and forecast revenue.

Continuing the example, at activity 306 of segment generation method 300, data processing module 216 pre-processes features data 224 to generate pre-processed data 226. In this example, data processing module 216 identifies forecast revenue, historical demand volume, life cycle stage, and item category as correlated to one or more of the other features, determines that the correlations are within the threshold for removal, and removes forecast revenue, historical demand volume, life cycle stage, and item category to reduce dimensional complexity and redundancy.

At activity 308 of segment generation method 300, segmentation module 218 performs multi-dimension segmentation on pre-processed data 226 and computes feature importance to generate segments. In this example, segmentation module 218 generates ten segments and stores the ten segments in segmentation data 228.

Continuing the example, at activity 310 of segment generation method 300, user interface module 210 visualizes segment output and assigns policy parameters to segmentation data 228. In this example, segmentation module 218 accesses, at activity 310 of segment generation method 300, segmentation data 228 and performs visualization and policy assignment method 400 described above to visualize segment output and assign policy parameters to segmentation data 228.

Continuing the example, at activity 402 of visualization and policy assignment method 400, user interface module 210 visualizes segment output. User interface module 210 accesses segmentation data 228 and generates an exemplary segment visualization display 500, illustrated by FIG. 5, suitable for output on one or more output devices 154, to visualize the segment output.

Figure 5:
FIG. 5 illustrates an exemplary segment visualization display, according to an embodiment.

FIG. 5 illustrates an exemplary segment visualization display 500, according to an embodiment. In an embodiment, segment visualization display 500 may display segment panel 502, information panel 504, policy parameters panel 506, and collaboration panel 508. Although segment visualization display 500 is illustrated and described as comprising a single segment panel 502, information panel 504, policy parameters panel 506, and collaboration panel 508, embodiments contemplate user interface module 210 generating segment visualization displays 500 in any configuration and displaying any data stored in segmentation planner database 114, according to particular needs.

Continuing the example, segment panel 502 displays the ten segments generated by segmentation module 218. Information panel 504, displayed at the top of segment visualization display 500 as illustrated by FIG. 5, may provide information regarding the customer, region, and/or department to which the generated segments may apply. Policy parameters panel 506 may display one or more policy parameters which may be assigned to one or more segments, as described in greater detail below. In the embodiment illustrated by this example, the policy parameters comprise "Balanced," "Responsive," "Agile," "Efficient," and "Very Responsive;" in other embodiments not illustrated by this example, policy parameters may comprise any quantity of policy parameters in any configuration, according to particular needs. Collaboration panel 508 of segment visualization display 500 may comprise one or more communication tools, including but not limited to one or more chat text boxes and/or direct messaging boxes, to allow decision makers to communicate with other decision makers throughout the visualization and policy assignment method 400.

Continuing the example, and still at activity 402 of visualization and policy assignment method 400, user interface module 210 may respond to input to one or more input devices 152 that instructs the segmentation planner 110 to generate one or more output review visualizations 600. According to embodiments, output review visualizations 600 may visually display information about autonomously-generated segments, dimensions, features, and/or any other data stored in segmentation planner database 114. Continuing the example, in response to the detected input, user interface module 210 generates output review visualization 600, illustrated by FIG. 6, displaying each of the ten autonomously-generated segments.

Figure 6:
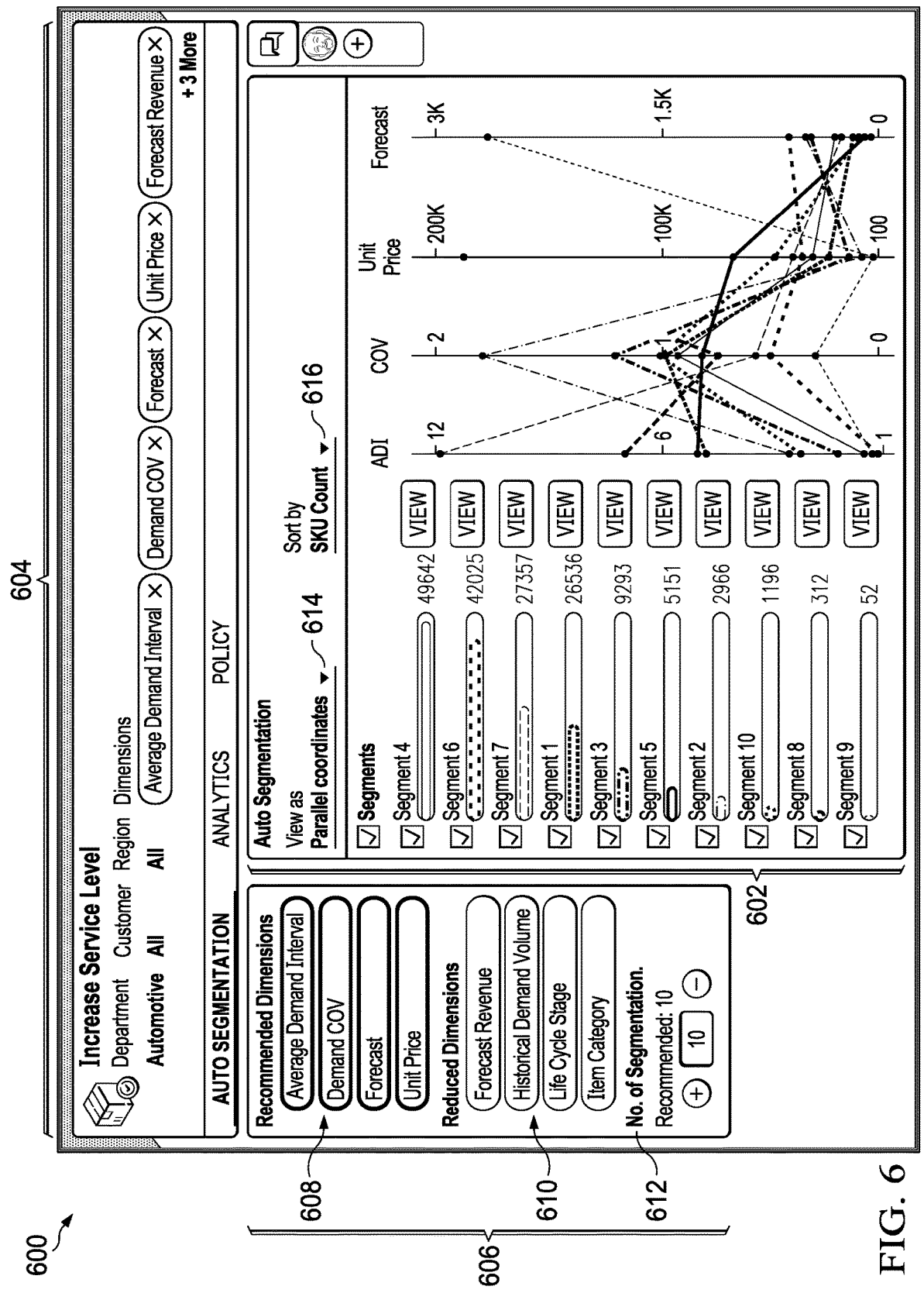
FIG. 6 illustrates an exemplary output review visualization, according to an embodiment.

FIG. 6 illustrates an exemplary output review visualization 600, according to an embodiment. In an embodiment, output review visualization 600 may display segment display panel 602, dimension selection panel 604, and dimension modification panel 606. Although output review visualization 600 is illustrated and described as comprising a single segment display panel 602, dimension selection panel 604, and dimension modification panel 606, embodiments contemplate user interface module 210 generating output review visualizations 600 in any configuration and displaying any data stored in segmentation planner database 114, according to particular needs.

Continuing the example, in an embodiment, segment display panel 602 displays data regarding each of the ten autonomously-generated segments according to each of four selected features (in the example illustrated by FIG. 6, ADI, COV, unit price, and forecast). In this example, segment display panel 602 displays segment data in a line format; other output review visualizations 600 may display segment data in bar charts, pie charts, three-dimensional renderings, or any other two-dimensional or three-dimensional display formats. Segment display panel 602 may provide "view as" button 614 and "sort by" button 616, which may alter the data displayed on segment display panel 602 using any sorting or view-altering mechanisms. Dimension selection panel 604, displayed on the top portion of output review visualization 600 illustrated by FIG. 6, may enable the selection of one or more features displayed on segment display panel 602. Dimension modification panel 606, displayed on the left side of output review visualization 600 illustrated by FIG. 6, may include recommended dimensions component 608, reduced dimensions component 610, and segmentation counter 612. User interface module 210 may respond to input from one or more input devices 152, and may (1) add additional features to segment display panel 602; (2) remove features from segment display panel 602, and (3) increase or decrease quantity of segments, as described in greater detail below.

Continuing the example, and at activity 404 of visualization and policy assignment method 400, segmentation module 218 determines whether to assign one or more policy parameters to segmentation data 228. In this example, segmentation module 218 responds to input from user interface module 210 that includes a command to assign policy parameters. Segmentation planner 110 proceeds to activity 406 of visualization and policy assignment method 400 and assigns policy parameters.

Continuing the example, at activity 406 of visualization and policy assignment method 400, user interface module 210 assigns policy parameters to segmentation data 228. User interface module 210 accesses segmentation data 228, and/or pre-processed data 226, and generates policy parameter assignment visualization 700, illustrated by FIG. 7, to display segments and assign policy parameters.

FIG. 7 illustrates an exemplary policy parameter assignment visualization 700, according to an embodiment. In an embodiment, policy parameter assignment visualization 700 may display segment panel 702 allowing the assignment of policy parameters to each segment, information panel 704, policy parameters panel 706, and collaboration panel 708. Although policy parameter assignment visualization 700 is illustrated and described as comprising a single segment panel 702, information panel 704, policy parameters panel 706, and collaboration panel 708, embodiments contemplate user interface module 210 generating policy parameter assignment visualizations 700 in any configuration and displaying any data stored in segmentation planner database 114, according to particular needs.

Continuing the example, user interface module 210 responds to input to one or more input devices 152, and assigns one of the five available policy parameters (in this example, comprising "Balanced," "Responsive," "Agile," "Efficient," and "Very Responsive") to each of the ten segments stored in segmentation data 228 and displayed on segment panel 702 of policy parameter assignment visualization 700. User interface module 210 stores assigned policy parameters for each of the ten segments in assigned policy parameters data 230.

At activity 408 of visualization and policy assignment method 400, user interface module 210 generates segmentation dashboard visualization 800. User interface module 210 accesses segmentation data 228, including one or more segments, and assigned policy parameters data 230, including the assigned policy parameters. User interface module 210 generates segmentation dashboard visualization 800, illustrated by FIG. 8, suitable for output on one or more output devices 154.

Figure 8:
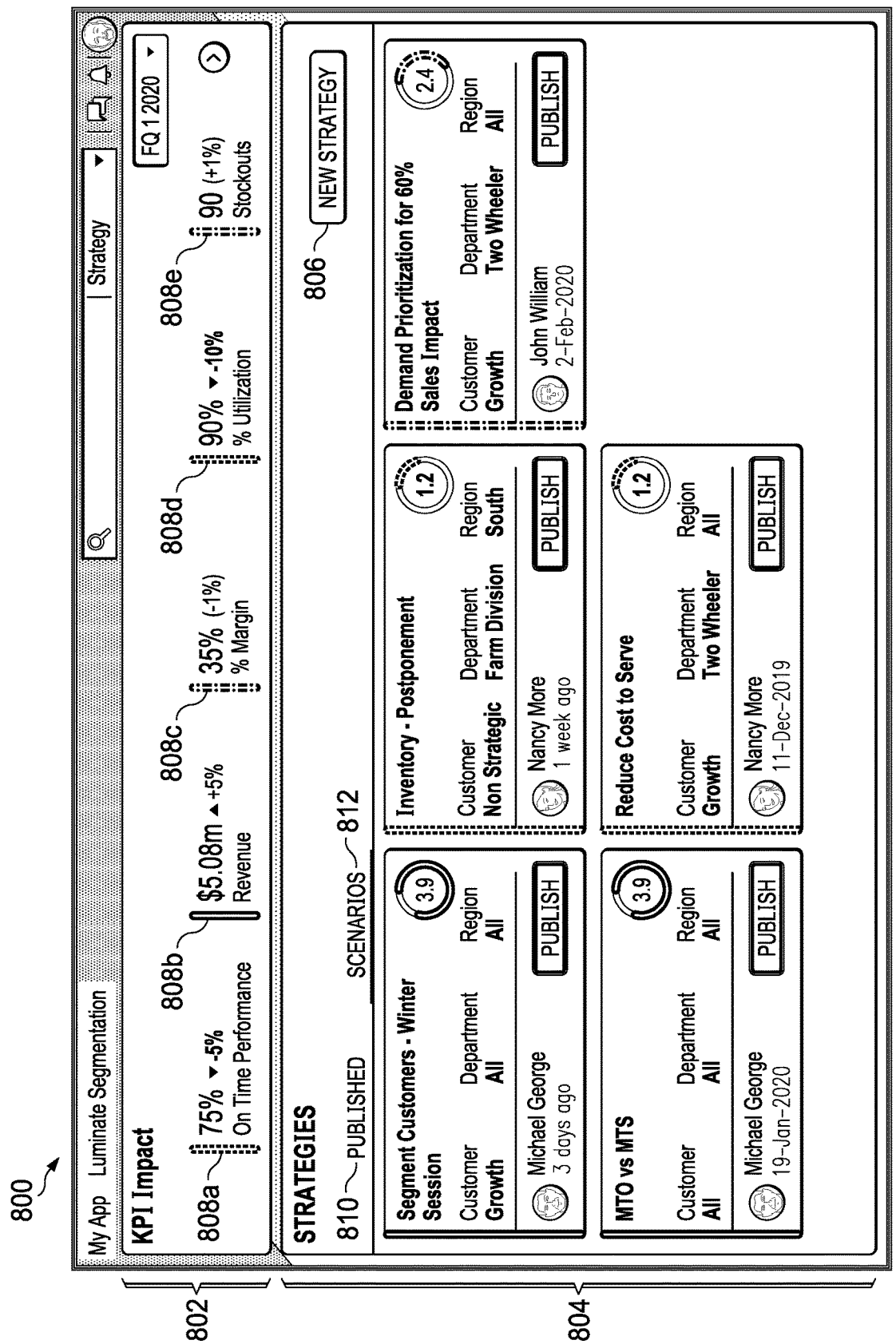
FIG. 8 illustrates an exemplary segmentation dashboard visualization, according to an embodiment.

FIG. 8 illustrates an exemplary segmentation dashboard visualization 800, according to an embodiment. In an embodiment, segmentation dashboard visualization 800 may display KPI impact panel 802, strategies panel 804, and new strategy button 806. Although segmentation dashboard visualization 800 is illustrated and described as comprising a single KPI impact panel 802, a single strategies panel 804, and a single new strategy button 806, embodiments contemplate user interface module 210 generating segmentation dashboard visualizations 800 and associated information panels in any configuration and displaying any data stored in segmentation planner database 114, according to particular needs.

Continuing the example, KPI impact panel 802 displays the estimated impact, calculated by segmentation module 218 and stored in segmentation data 228, that one or more new segments and/or supply chain plans leveraging one or more new segments may have on one or more key performance indicators (KPIs) 808a-808e. According to embodiments, KPI impact panel 802 may display any KPIs, including but not limited to on time performance 808a, revenue 808b, % margin 808c, % utilization 808d, and stockouts 808e. Strategies panel 804 displays one or more published strategies 810, and/or one or more potential strategy scenarios 812, that utilize one or more segments generated by the segmentation planner 110. According to embodiments, user interface module 210 may respond to input to one or more input devices 152, and may select one or more strategies to publish for live use in one or more supply chain systems and/or business environments. New strategy button

806 may enable the selection of one or more new segmentation strategies, described in greater detail below in relation to FIG. 13.

Continuing the example, at activity 410 of visualization and policy assignment method 400, user interface module 210 determines whether to display one or more segmentation analytics and associated visualizations. In this example, user interface module 210 responds to input from one or more input devices 152 that includes a command to display segmentation analytics and associated visualizations. Segmentation planner 110 proceeds to activity 412 of visualization and policy assignment method 400 and generates segmentation analytics visualization 900, illustrated by FIG. 9. User interface module 210 accesses segmentation data 228 and assigned policy parameters data 230, and generates segmentation analytics visualization 900.

Figure 9:
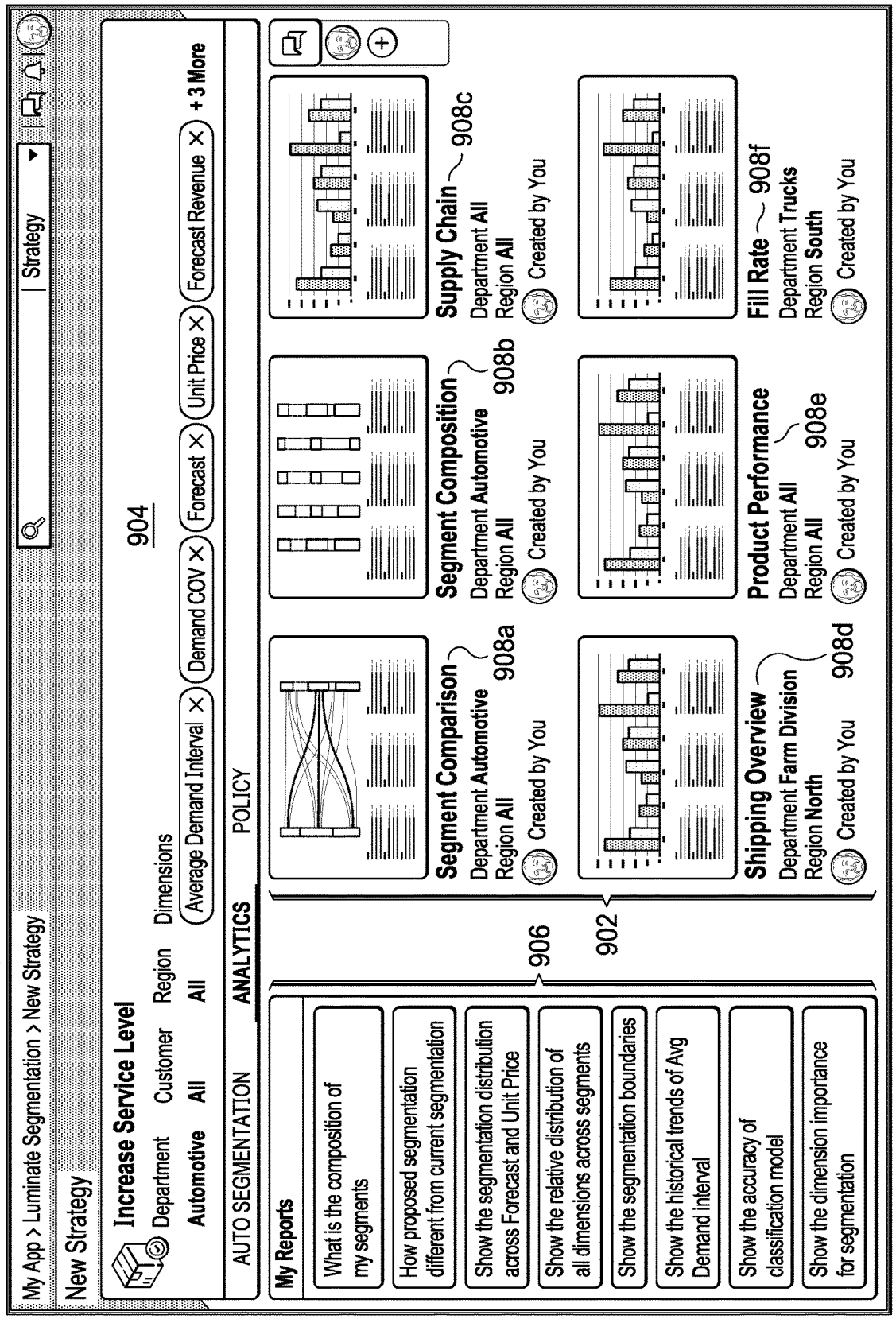
FIG. 9 illustrates an exemplary segmentation analytics visualization, according to an embodiment.

FIG. 9 illustrates an exemplary segmentation analytics visualization 900, according to an embodiment. In an embodiment, segmentation analytics visualization 900 may display comparison panel 902, information panel 904, and "My Reports" panel 906. Although segmentation analytics visualization 900 is illustrated and described as comprising a single comparison panel 902, information panel 904, and "My Reports" panel 906, embodiments contemplate user interface module 210 generating segmentation analytics visualizations 900 in any configuration and displaying any data stored in segmentation planner database 114, according to particular needs.

Figure 11:
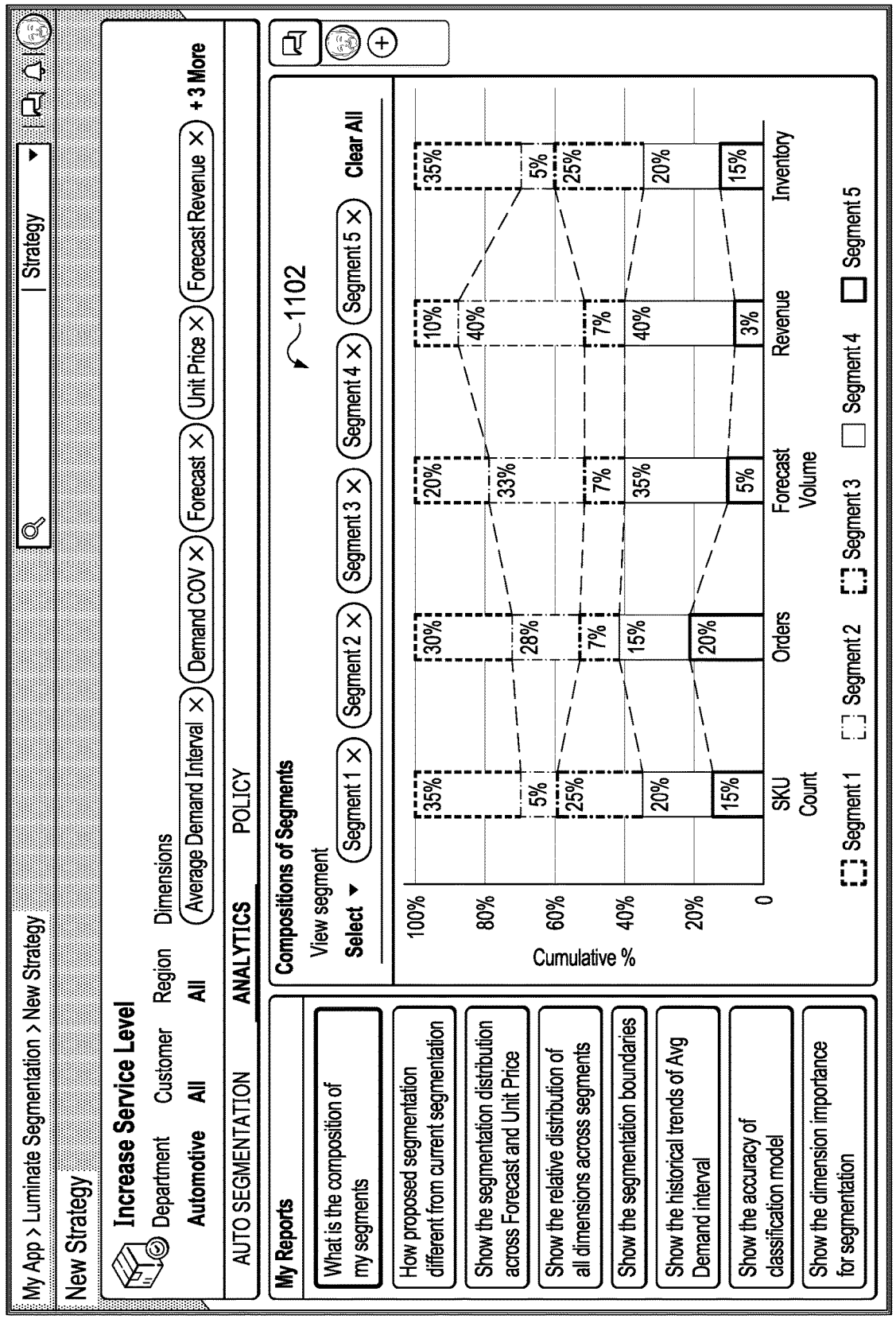
FIG. 11 illustrates a first component analytics visualization, according to an embodiment.
Figure 12:
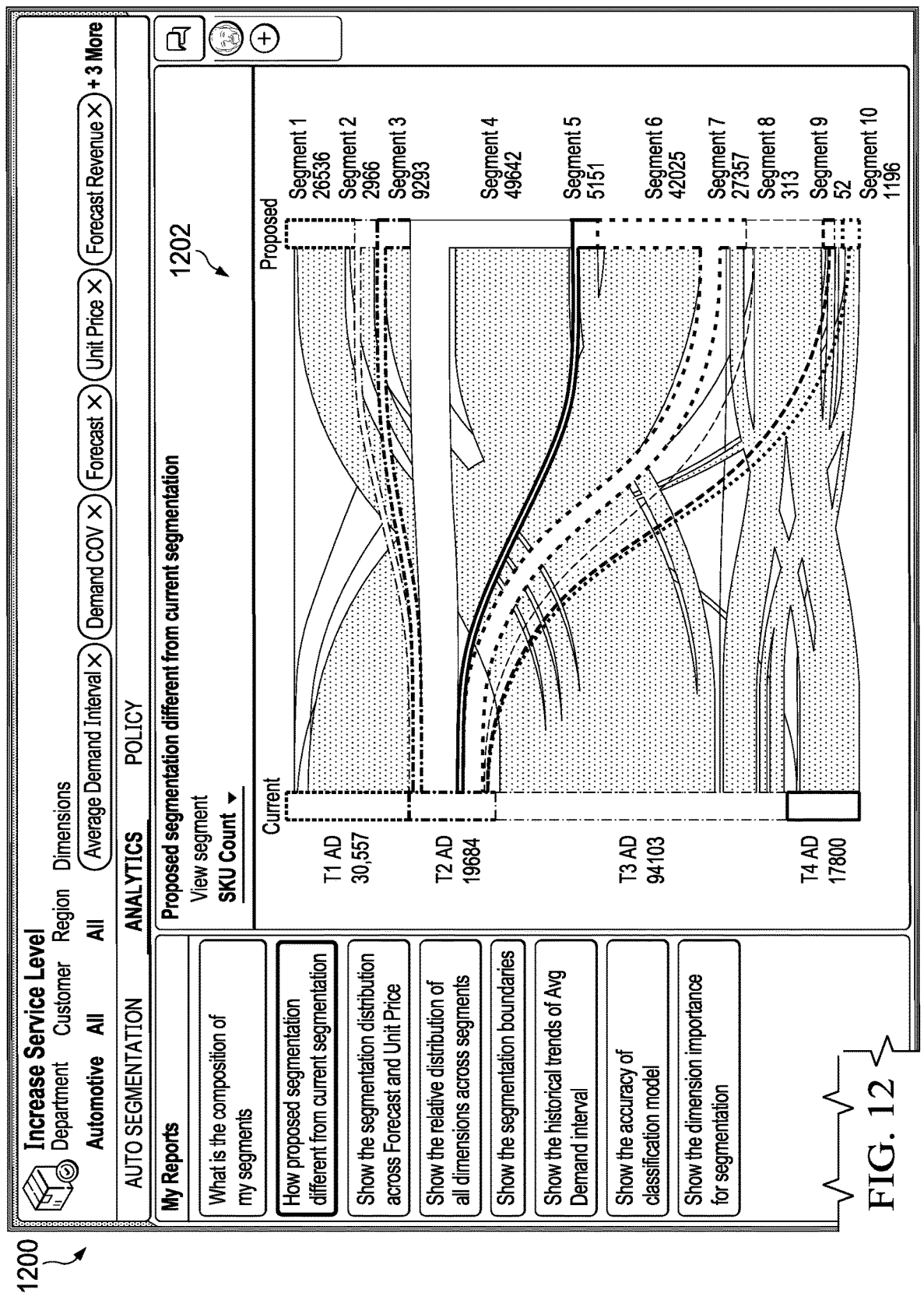
FIG. 12 illustrates a second component analytics visualization, according to an embodiment.

Continuing the example, comparison panel 902 displays assorted data related to the autonomously-generated segments, segment composition, and/or any other data stored in segmentation planner database 114. According to embodiments, comparison panel 902 may also display one or more component analytics displays, which may display additional information and data regarding one or more segments, dimensions, features, or other data stored in segmentation planner database 114. In the embodiment illustrated by FIG. 9, comparison panel 902 displays the following six component analytics displays: "Segment Comparison," "Segment Composition," "Supply Chain," "Shipping Overview," "Product Performance," and "Fill Rate." User interface module 210 may respond to input from one or more input devices 152 and may 'select' one or more component analytics displays to display in greater detail on one or more output devices 154, as illustrated by FIGS. 11 and 12 herein. Although examples of component analytics displays are illustrated and described herein, embodiments contemplate segmentation planner 110 generating any quantity of component analytics displays in any configuration associated with one or more segmentation analytics visualizations 900, according to particular needs.

Continuing the example, "My Reports" panel 906 of segmentation analytics visualization 900 comprises a plurality of reports. In an embodiment, segmentation module 218 accesses segmentation data 228 and assigned policy parameters data 230, and generates one or more reports related to segmentation data 228 and assigned policy parameters data 230. Segmentation module 218 stores the reports in reports data 232, and user interface module 210 accesses the reports data 232 and displays the reports on the segmentation analytics visualization 900. In the example illustrated by FIG. 9, the reports comprise "What is the composition of my segments?", "How is the proposed segmentation different from current segmentation?", "Show the segmentation distribution across Forecast and Unit Price," "Show the relative distribution of all dimensions across segments," "Show the segmentation boundaries," "Show the historical trends of Avg Demand interval," "Show the accuracy of classification model," and "Show the dimension importance for segmentation." Although FIG. 9 illustrates examples of reports, embodiments contemplate segmentation module 218 and user interface module 210 generating and displaying reports in any format and related to any data stored in segmentation planner database 114, according to particular needs. In an embodiment, user interface module 210 may respond to input to one or more input devices 152 that selects a report. In response, user interface module 210 may generate output review visualization 600, policy parameter assignment visualization 700, segmentation dashboard visualization 800, segmentation analytics visualization 900, or component analytics display that displays information related to the report.

Continuing the example, at activity 414 of visualization and policy assignment method 400, segmentation planner 110 determines whether to modify one or more segments. In this example, user interface module 210 receives a command to increase the quantity of segments from ten to eleven in response to input from one or more input devices 152 to segmentation counter 612, displayed by output review visualization 600 of FIG. 6. In response to this selection, segmentation planner 110 returns to activity 402 of the visualization and policy assignment method 400, and visualizes a segment output with eleven segments. Segmentation planner 110 continues the actions of visualization and policy assignment method 400 described above, makes no further additions or deletions to the quantity of segments, and terminates visualization and policy assignment method 400.

Figure 10:
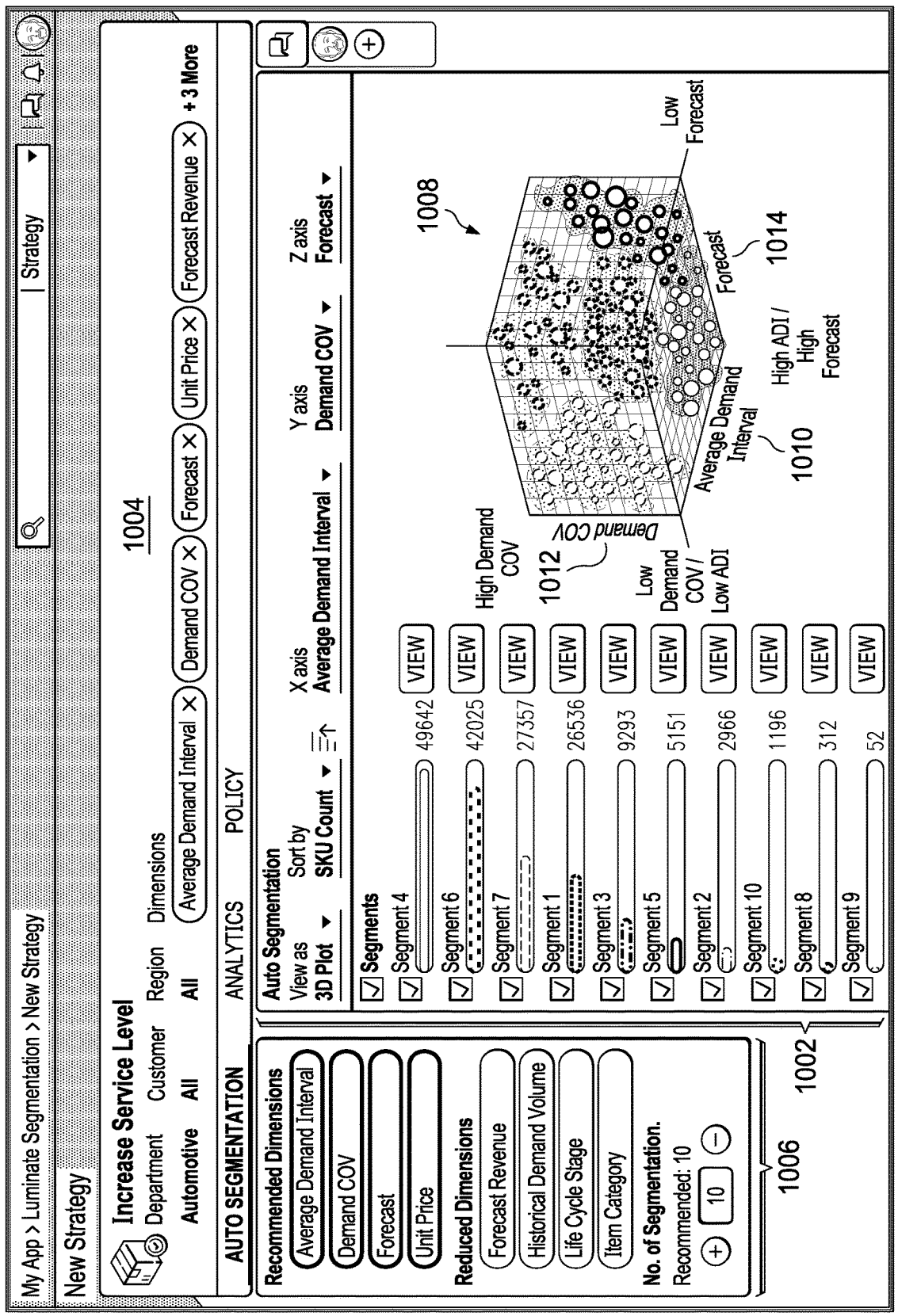
FIG. 10 illustrates an exemplary second output review visualization, according to an embodiment.

FIG. 10 illustrates an exemplary second output review visualization 1000, according to an embodiment. In an embodiment, second output review visualization 1000 may display segment display panel 1002, dimension selection panel 1004, and dimension modification panel 1006. Although second output review visualization 1000 is illustrated and described as comprising a single segment display panel 1002, dimension selection panel 1004, and dimension modification panel 1006, embodiments contemplate user interface module 210 generating second output review visualizations 1000 in any configuration and displaying any data stored in segmentation planner database 114, according to particular needs.

As compared to output review visualization 600 illustrated by FIG. 6, second output review visualization 1000 illustrated by FIG. 10 may display a second view of segments on segment display panel 1002. In the embodiment illustrated by FIG. 10, segment display panel 1002 may display a plurality of segments on three-dimensional graphical display 1008 arranged according to average demand interval 1010 (as an X-axis), demand COV 1012 (as a Y-axis), and forecast 1014 (as a Z-axis). According to embodiments, user interface module 210 may generate and display any quantity of second output review visualizations 1000, in any configuration, during activity 402 of visualization and policy assignment method 400, and/or at other actions of the visualization and policy assignment method 400.

FIG. 11 illustrates first component analytics visualization 1100, according to an embodiment. In an embodiment, user interface module 210 may respond to input from one or more input devices 152 and may select one or more reports from "My Reports" panel 906 of segmentation analytics visualization 900, illustrated by FIG. 9. In response to this selection, user interface module 210 may generate first component analytics visualization 1100, displaying additional data regarding segments, features, dimensions, and other segmentation planner database 114 data that relates to the selected report. In the embodiment illustrated by FIG. 11, user interface module 210 responds to input selecting the "What is the composition of my segments?" report. User interface module 210 generates first component analytics visualization 1100 displaying data related to composition of selected segments 1102. Although particular examples of first component analytics visualizations 1100 are illustrated and described herein, embodiments contemplate user interface module 210 generating and displaying first component analytics visualizations 1100 in any configuration and displaying any data stored in the segmentation planner database 114, according to particular needs.

FIG. 12 illustrates second component analytics visualization 1200, according to an embodiment. In the embodiment illustrated by FIG. 12, user interface module 210 responds to input selecting the "How is the proposed segmentation different from current segmentation?" report displayed on segmentation analytics visualization 900, and responds by generating second component analytics visualization 1200 displaying data related to differences between proposed segmentation and current segmentation 1202. Although particular examples of second component analytics visualizations 1200 are illustrated and described herein, embodiments contemplate user interface module 210 generating and displaying second component analytics visualizations 1200 in any configuration and displaying any data stored in segmentation planner database 114, according to particular needs.

In the embodiment illustrated by FIG. 12, user interface module 210 may highlight, using one or more distinct colors, one or more segments from the current segmentation strategy and the divisional pathways by which the current one or more segments will be divided in the proposed segmentation strategy. Conversely, user interface module 210 may highlight, using one or more distinct colors, one or more segments from the proposed segmentation strategy and the input pathways by which the proposed one or more proposed segments will receive portions of the current segments. User interface module 210 may color and/or highlight selected components of the current segmentation strategy and/or the proposed segmentation strategy in response to input from one or more input devices 152, according to particular needs.

Figure 13:
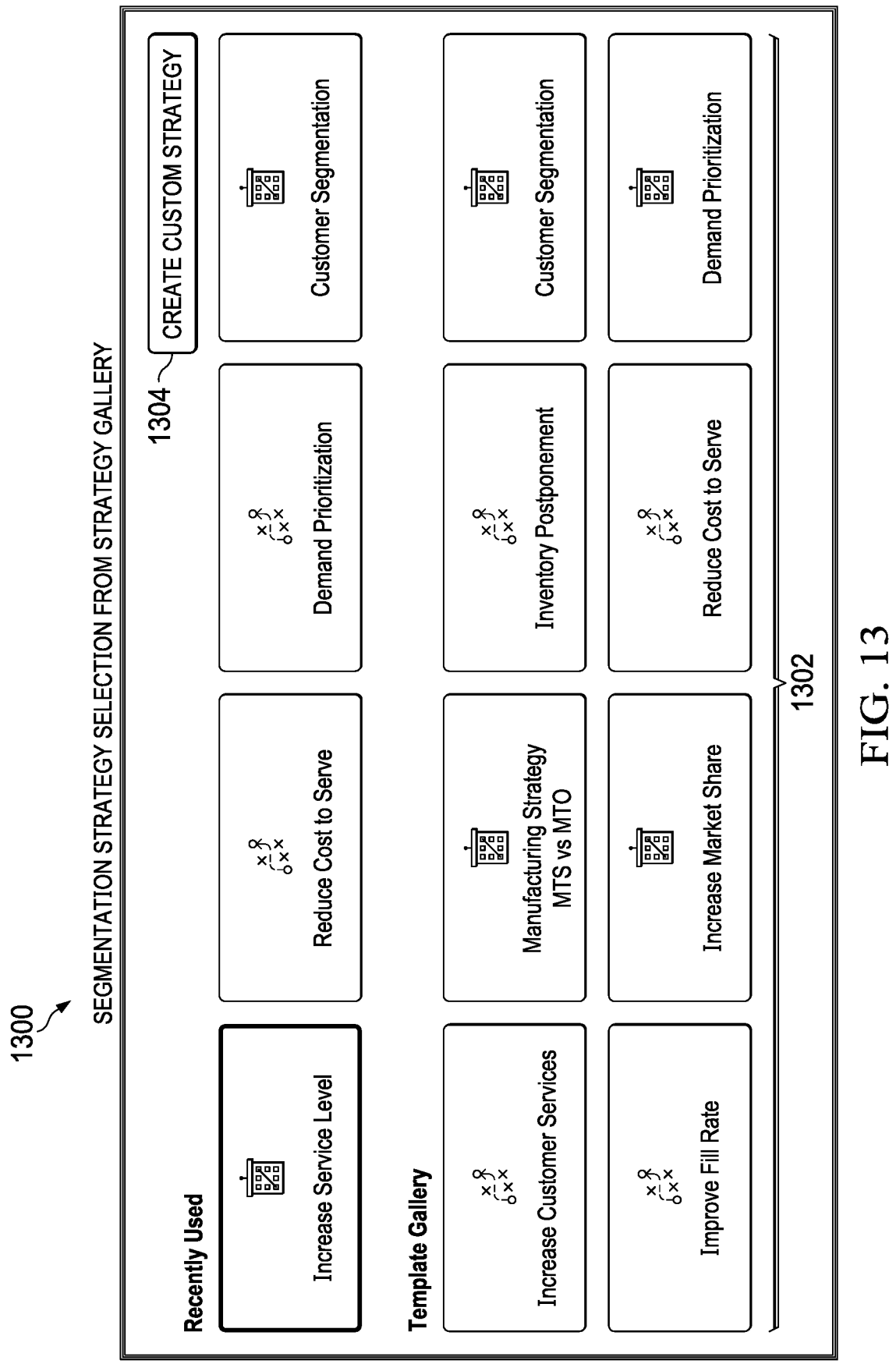
FIG. 13 illustrates a segmentation strategy selection visualization, according to an embodiment.

FIG. 13 illustrates segmentation strategy selection visualization 1300, according to an embodiment. In an embodiment, user interface module 210 may generate and display segmentation strategy selection visualization 1300 in response to user interface module 210 detecting one or more input device 152 inputs that select and activate, on segmentation dashboard visualization 800 illustrated by FIG. 8, new strategy button 806. According to embodiments, segmentation strategy selection visualization 1300 may display one or more template gallery options 1302 by which to instruct segmentation planner 110 to generate one or more new segments, and/or reorganize or delete one or more existing segments, during activity 308 of segment generation method 300. As illustrated by FIG. 13, segmentation strategy selection visualization 1300 comprises the following template gallery options 1302: "Increase Service Level," "Reduce Cost to Serve (1)," "Demand Prioritization," "Customer Segmentation," "Increase Customer Services," "Manufacturing Strategy MTS vs. MTO," "Inventory Postponement," "Customer Selection," "Improve Fill Rate," "Increase Market Share," "Reduce Cost to Serve (2)," and "Demand Prioritization." In other embodiments not illustrated by FIG. 13, segmentation strategy selection visualization 1300 may comprise any quantity of template gallery options 1302 in any format, according to particular needs.

Segmentation strategy selection visualization 1300 may also comprise "Create Custom Strategy" button 1304. "Create Custom Strategy" button 1304 may direct segmentation planner 110 to generate one or more custom strategies, and to generate one or more new segments and/or reorganize or delete one or more existing segments in response to the one or more custom strategies. In an embodiment, user interface module 210 may select and activate "Create Custom Strategy" button 1304 in response to input from one or more input devices 152. Further in response, user interface module 210 may generate and display custom strategy visualization 1400, illustrated by FIG. 14.

Figure 14:
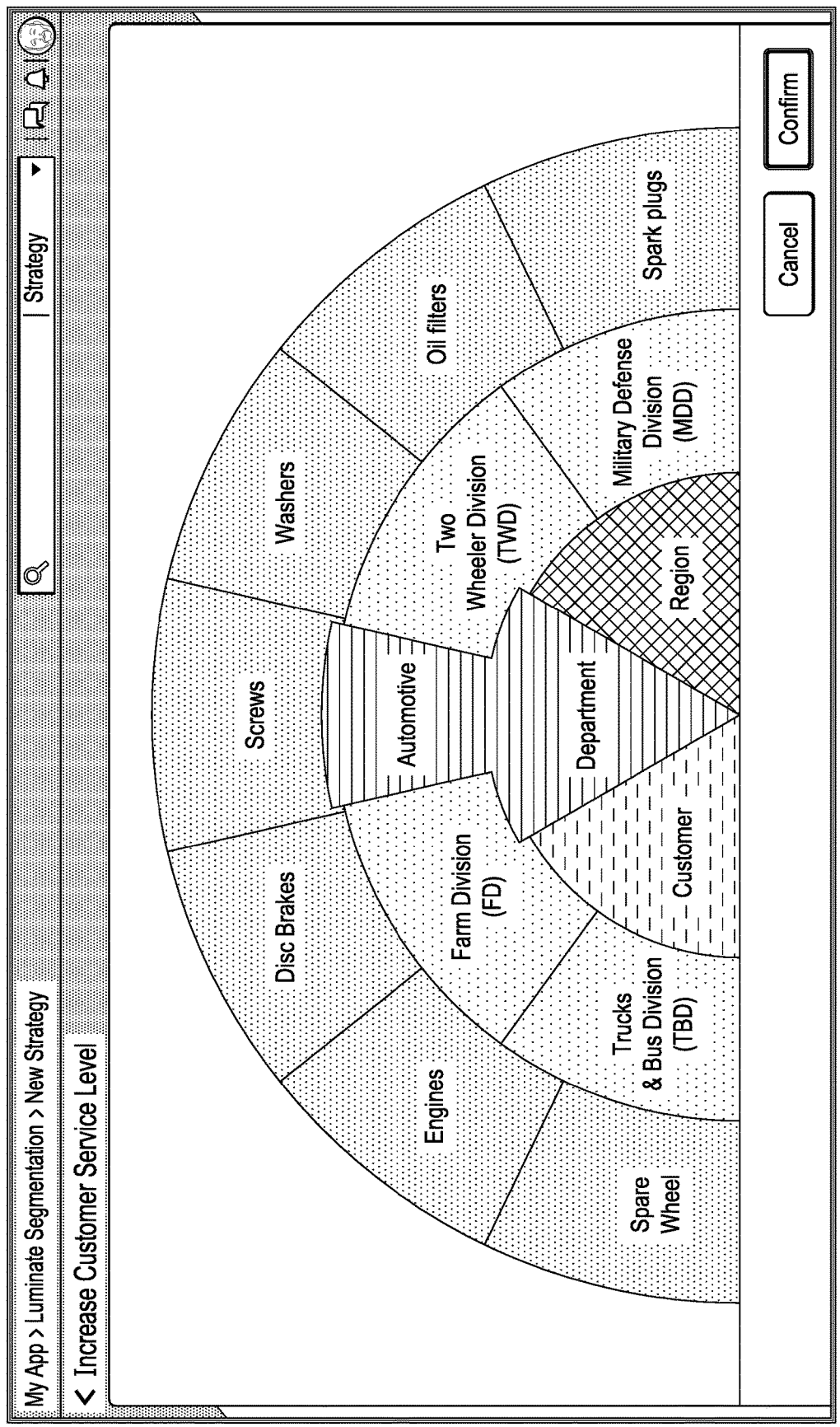
FIG. 14 illustrates a custom strategy visualization, according to an embodiment.

FIG. 14 illustrates custom strategy visualization 1400, according to an embodiment. Custom strategy visualization 1400 may display a series of potential features, dimensions, products, regions, or other data to enable the custom creation of one or more segments. In an embodiment, user interface module 210 may respond to input to one or more input devices 152, and may select and/or customize one or more custom segments or segmentation plans. User interface module 210 may store data related to the one or more custom segments in segmentation data 228 of database 114.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for autonomous multi-dimensional segmentation, comprising:
   a supply chain network comprising one or more supply chain entities; and
   a segmentation planner comprising a computer and memory, the segmentation planner configured to autonomously:
   receive, from automated machinery having at least one sensor, product data corresponding to one or more items, wherein the product data comprises at least one image of each of the one or more items;
   receive, from the automated machinery, a current location for each of the one or more items;
   access input data relating to the one or more items, wherein the one or more items correspond to the one or more supply chain entities;
   discover one or more features related to the input data;
   pre-process the input data and features;
   perform multi-dimension segmentation on the input data;
   generate one or more segment output visualizations, wherein the one or more segment output visualizations are one or more output review visualizations comprising:
   a segment display panel;
   a dimension selection panel;
   a dimension modification panel;
   a recommended dimensions component;
   a reduced dimensions component;
   a segmentation counter; and a three-dimensional graphical display of a plurality of segments;
assign policy parameters to the multi-dimension segmentation performed on the input data; and
autonomously control the automated machinery to add to or remove from a shipment the one or more items according to the policy parameters.

2. The system of claim 1, wherein the one or more segment output visualizations are a multi-dimension segmentation visualization comprising:
a segment panel;
an information panel;
a policy parameters panel; and
a collaboration panel.

3. The system of claim 1 wherein the one or more segment output visualizations are one or more segmentation dashboards comprising:
a key performance indicator impact panel;
a strategies panel;
one or more key performance indicators;
one or more published strategies; and
one or more potential strategy scenarios.

4. The system of claim 1 wherein the one or more segment output visualizations are one or more segmentation analytics visualizations comprising:
data related to differences between proposed segmentation and current segmentation;
a comparison panel;
an information panel; and
a report panel configured to generate one or more component analytics visualizations, comprising data related a composition of selected segments.

5. The system of claim 4, wherein the segmentation planner, after generating the one or more segmentation analytics visualizations, is further configured to alter the configuration of the one or more segment output visualizations to include one or more new features.

6. The system of claim 1 wherein the segmentation planner performing multi-dimension segmentation on the input data is configured to:
select an autonomous segmentation algorithm from a list of autonomous segmentation algorithms stored in the database;
perform autonomous segmentation on the input data and one or more features, using the selected autonomous segmentation algorithm;
generate an autonomous segmentation visualization;
compute the relative importance of the one or more features associated with the autonomous segmentation visualization; and
in response to the segmentation planner determining that the relative importance of one or more features is below a defined threshold:
delete the one or more features associated with a relative importance below the defined threshold; and
repeat the autonomous segmentation on the input data and remaining features.

7. A computer-implemented method for autonomous multi-dimensional segmentation, comprising:
receive, by a segmentation planner comprising a computer and memory, product data corresponding to one or more items, wherein the product data is received from automated machinery having at least one sensor, wherein the product data comprises at least one image of each of the one or more items;
receive, from the automated machinery, a current location for each of the one or more items;
accessing input data relating to the one or more items, wherein the one or more items correspond to one or more supply chain entities;
discovering one or more features related to the input data;
pre-processing the input data and features;
performing multi-dimension segmentation on the input data;
generating one or more segment output visualizations, wherein the one or more segment output visualizations are one or more output review visualizations comprising:
a segment display panel;
a dimension selection panel;
a dimension modification panel;
a recommended dimensions component;
a reduced dimensions component;
a segmentation counter; and
a three-dimensional graphical display of a plurality of segments;
assigning policy parameters to the multi-dimension segmentation performed on the input data; and
controlling autonomously, by the segmentation planner, the automated machinery to add to or remove from a shipment the one or more items according to the policy parameters.

8. The computer-implemented method of claim 7, wherein the one or more segment output visualizations are a multi-dimension segmentation visualization comprising:
a segment panel;
an information panel;
a policy parameters panel; and
a collaboration panel.

9. The computer-implemented method of claim 7 wherein the one or more segment output visualizations are one or more segmentation dashboards comprising:
a key performance indicator impact panel;
a strategies panel;
one or more key performance indicators;
one or more published strategies; and
one or more potential strategy scenarios.

10. The computer-implemented method of claim 7 wherein the one or more segment output visualizations are one or more segmentation analytics visualizations comprising:
data related to differences between proposed segmentation and current segmentation;
a comparison panel;
an information panel; and
a report panel configured to generate one or more component analytics visualizations, comprising data related a composition of selected segments.

11. The computer-implemented method of claim 10, further comprising the segmentation planner, after generating the one or more segmentation analytics visualizations, altering the configuration of the one or more segment output visualizations to include one or more new features.

12. The computer-implemented method of claim 7, further comprising:
selecting an autonomous segmentation algorithm from a list of autonomous segmentation algorithms stored in the database;
performing autonomous segmentation on the input data and one or more features, using the selected autonomous segmentation algorithm;
generating an autonomous segmentation visualization;

computing the relative importance of the one or more features associated with the autonomous segmentation visualization; and in response to the segmentation planner determining that the relative importance of one or more features is below a defined threshold:
   deleting the one or more features associated with a relative importance below the defined threshold; and
   repeating the autonomous segmentation on the input data and remaining features.

13. A non-transitory computer-readable medium embodied with software providing autonomous multi-dimensional segmentation, the software when executed:
   receives, from automated machinery having at least one sensor, product data corresponding to one or more items, wherein the product data comprises at least one image of each of the one or more items;
   receives, from the automated machinery, a current location for each of the one or more items;
   accesses input data relating to the one or more items, wherein the one or more items correspond to one or more supply chain entities;
   discovers one or more features related to the input data;
   pre-processes the input data and features;
   performs multi-dimension segmentation on the input data;
   generates one or more segment output visualizations, wherein the one or more segment output visualizations are one or more output review visualizations comprising:
      a segment display panel;
      a dimension selection panel;
      a dimension modification panel;
      a recommended dimensions component;
      a reduced dimensions component;
      a segmentation counter; and
      a three-dimensional graphical display of a plurality of segments;
   assigns policy parameters to the multi-dimension segmentation performed on the input data; and
   autonomously controls the automated machinery to add to or remove from a shipment the one or more items according to the policy parameters.

14. The non-transitory computer-readable medium of claim 13, wherein the one or more segment output visualizations are a multi-dimension segmentation visualization comprising:
   a segment panel;
   an information panel;
   a policy parameters panel; and
   a collaboration panel.

15. The non-transitory computer-readable medium of claim 13, wherein the one or more segment output visualizations are one or more segmentation dashboards comprising:
   a key performance indicator impact panel;
   a strategies panel;
   one or more key performance indicators;
   one or more published strategies; and
   one or more potential strategy scenarios.

16. The non-transitory computer-readable medium of claim 13, wherein the one or more segment output visualizations are one or more segmentation analytics visualizations comprising:
   data related to differences between proposed segmentation and current segmentation;
   a comparison panel;
   an information panel; and
   a report panel configured to generate one or more component analytics visualizations, comprising data related a composition of selected segments.

17. The non-transitory computer-readable medium of claim 16, the software when executed further, after generating the one or more segmentation analytics visualizations, alters the configuration of the one or more segment output visualizations to include one or more new features.

18. The non-transitory computer-readable medium of claim 13, the software when executed further:
   selects an autonomous segmentation algorithm from a list of autonomous segmentation algorithms stored in the database;
   performs autonomous segmentation on the input data and one or more features, using the selected autonomous segmentation algorithm;
   generates an autonomous segmentation visualization;
   computes the relative importance of the one or more features associated with the autonomous segmentation visualization; and
   in response to the segmentation planner determining that the relative importance of one or more features is below a defined threshold:
      deletes the one or more features associated with a relative importance below the defined threshold; and
      repeats the autonomous segmentation on the input data and remaining features.

* * * * *